Nov. 3, 1931.    F. W. WAPPAT    1,830,579
ELECTRIC HANDSAW
Filed Jan. 30, 1930
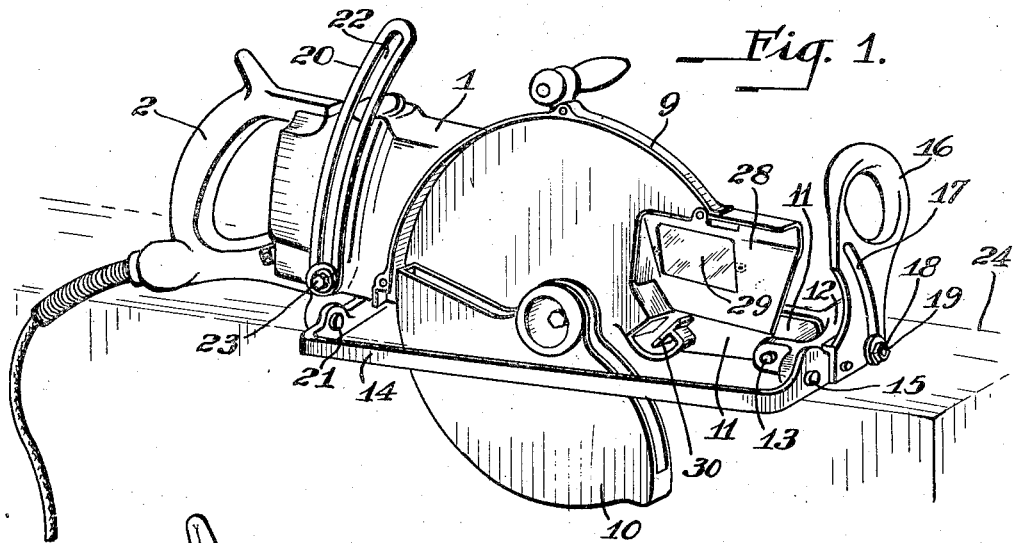
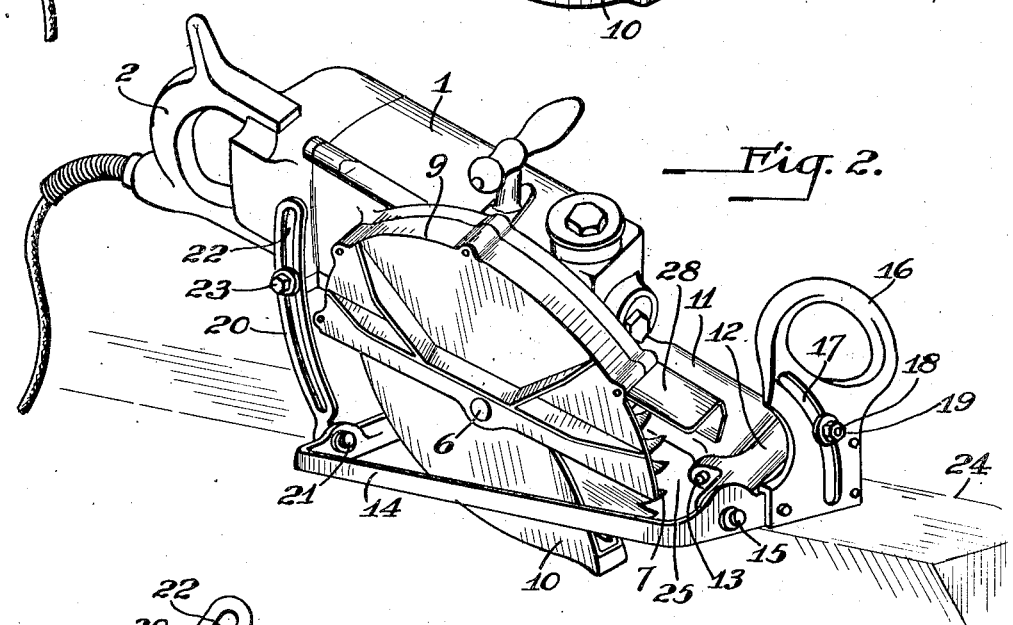
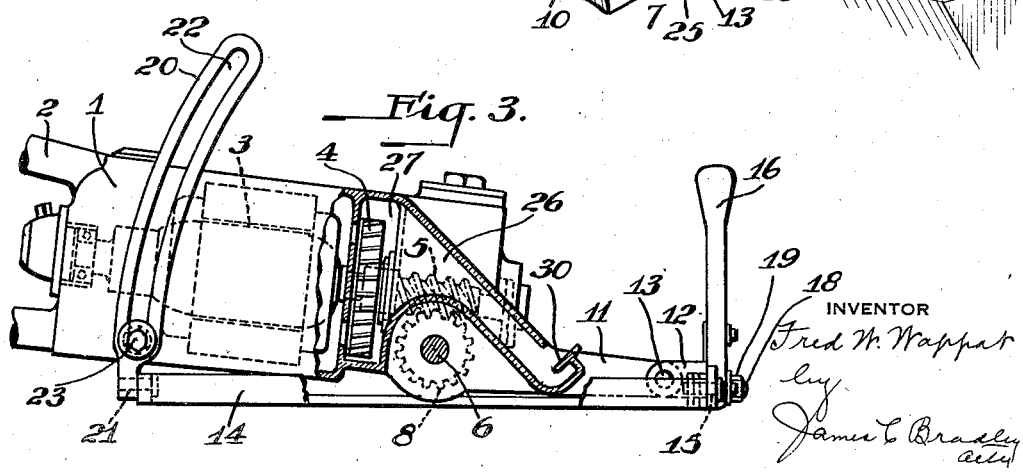
INVENTOR
Fred W. Wappat
by
James C. Bradley
atty Patented Nov. 3, 1931

1,830,579

UNITED STATES PATENT OFFICE

FRED W. WAPPAT, OF PITTSBURGH, PENNSYLVANIA, ASSIGNOR TO WAPPAT, INCORPORATED, A CORPORATION OF PENNSYLVANIA

ELECTRIC HANDSAW

Application filed January 30, 1930. Serial No. 424,551.

The invention relates to electric handsaws and involves certain improvements over the construction of my Patent No. 1,623,290. It has for its objects the provision of improved means for adjusting the saw so that it can be used to cut at any desired angle, and the provision of improved means permitting the observation of the forward edge of the saw by the operator as the saw cuts its way through the work. The latter feature includes the provision of a window of glass, celluloid, or the like at the forward end of the saw casing in connection with means for projecting a part of the blast from the fan of the saw against the window to keep it clear of the saw dust incident to the action of the saw upon the work. One embodiment of the invention is shown in the accompanying drawings, wherein:

Figure 1 is a perspective view with the parts in one position of adjustment with the saw and a part of the guard removed to show certain of the parts more clearly. Fig. 2 is a perspective view showing the parts in other positions of adjustment. And Fig. 3 is a partial side elevation and partial longitudinal section.

Referring to the drawings, 1 is the saw frame provided at one end with the handle 2, 3 is an electric motor suitably mounted in the frame and provided with a shaft carrying the fan wheel 4 and the worm 5; 6 is a shaft extending transversely of the frame and carrying the circular saw 7; 8 is a worm wheel keyed to the shaft 6 and meshing with the worm 5; 9 is a guard casing rigid with the frame and surrounding the upper half of the saw; and 10 is a movable guard casing or shield similar to that of my patent heretofore referred to, said shield or guard being pivoted concentric with the axis of rotation of the saw and being adapted to telescope into the fixed casing when swung to the rear.

The saw frame is provided at its front end with an arm 11, and to this arm is secured the bracket 12 by means of the pivot pin 13. The machine is provided with a base plate 14, which governs both the depth of cut of the saw and the angle of such cut, such base plate being cut away to permit of the adjustment of the saw and guard 10 therethrough and being pivoted at its front end to the bracket 12 by means of the pin 15. The base plate has secured to its front end a handle member 16 provided with a slot 17 in which slides the bolt 18 secured to the bracket 12. The bolt carries a clamping nut 19 for holding the base plate in any desired position of adjustment with respect to the bracket 12.

A second bracket 20 provides for the adjustment of the base plate to vary the depth of cut by the saw. This bracket is secured at its lower end to the base plate by means of the pivot pin 21. It is provided with a slot 22 through which extends the clamping bolt 23 threaded into the saw frame. The pivots 15 and 21 are in alignment with each other and lie in the plane of the saw 7. The adjustment around these pivots gives the saw its various angles in cutting miters, the nut 19 on the bolt 18 serving to clamp the base plate in its position relative to the saw frame during the sawing operation.

Fig. 1 shows the parts adjusted so that the saw will cut at right angles to the plane of the upper surface of the plank 24 and with a maximum depth of cut, the bracket 20 being at its uppermost position of adjustment. To cut at a less depth and at an angle of about 60 degrees to the upper face of the plank 24, the parts are adjusted to the position of Fig. 2, the base plate being tilted on the pivots 15 and 21 to the position shown and the bracket 20 being moved down and clamped.

To facilitate the removal of the cuttings produced by the operation of the saw, the casing 9 is cut away at 25 in Fig. 2. A blast of air is provided at this point by means of the passageway 26 (Fig. 3) leading from the chamber 27 surrounding the motor driven fan wheel 4. The side of the casing toward the operator is provided with a guard 28 for shielding him from the flying saw dust, but in order to permit him to see the forward edge of the saw so that he may guide the frame properly, an opening or window is provided through the guard in which is mounted a transparent pane of celluloid or glass 29. The dust tends to collect on this pane and obscure it, and in order to overcome this difficulty, a part of the air from the passageway 26 is caused to flow over the surface of the pane and clean it. This is preferably accomplished by providing a baffle or deflector 30 at the outlet end of the passageway opposite the window. The air which strikes this baffle is deflected upwardly and laterally against the pane and cleans it so that the operator can easily see the forward edge of the saw during the cutting operation.

What I claim is:

1. In combination in an electric hand saw, a saw frame having a handle at one end, a motor with a circular saw geared thereto carried by the frame, a fixed casing on the frame surrounding the edge and sides of the upper portion of the saw, said casing having an outlet opening for shavings adjacent the forward edge of the saw and an observation opening through its side wall to the rear of such edge of the saw with a transparent pane therein, a fan operated by the motor, and means for directing a blast of air from the fan forwardly adjacent the line of cut and through said outlet opening.

2. In combination in an electric hand saw, a saw frame having a handle at one end, a motor with a circular saw geared thereto carried by the frame, a fixed casing on the frame surrounding the edge and sides of the upper portion of the saw, said casing having an outlet opening for shavings adjacent the forward edge of the saw and an observation opening through its side wall to the rear of such edge of the saw with a transparent pane therein, a fan operated by the motor, and means for directing a blast of air from the fan forwardly adjacent the line of cut, and across the inner surface of said pane so as to clean it.

3. In combination in an electric hand saw, a saw frame having a handle at one end, a motor with a circular saw geared thereto carried by the frame, a fixed casing on the frame surrounding the edge and sides of the upper portion of the saw, said casing having an outlet opening for shavings adjacent the forward edge of the saw and an observation opening through its side wall to the rear of such edge of the saw with a transparent pane therein, a fan operated by the motor, means for directing a blast of air from the fan forwardly adjacent the line of cut of the saw and through said outlet opening, and a deflector for directing a part of said blast against said transparent pane to clean it.

In testimony whereof, I have hereunto subscribed my name this 28th day of January, 1930.

FRED W. WAPPAT.